US012389204B2

(12) United States Patent
Lim et al.

(10) Patent No.: US 12,389,204 B2
(45) Date of Patent: Aug. 12, 2025

(54) METHOD AND APPARATUS FOR ASSIGNING TALK GROUPS TO NETWORK SLICES

(71) Applicant: MOTOROLA SOLUTIONS, INC., Chicago, IL (US)

(72) Inventors: Bing Qin Lim, Bayan Lepas (MY); Zhe Qian Goh, Simpang Ampat (MY); Moheinvarman Subramaniam, Batu Ferringhi (MY); Tejeash Duraimanickam, Lunas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 412 days.

(21) Appl. No.: 17/812,448

(22) Filed: Jul. 14, 2022

(65) Prior Publication Data
US 2024/0022878 A1    Jan. 18, 2024

(51) Int. Cl.
*H04W 4/06* (2009.01)
*H04W 28/24* (2009.01)
*H04W 48/18* (2009.01)

(52) U.S. Cl.
CPC ............ *H04W 4/06* (2013.01); *H04W 28/24* (2013.01); *H04W 48/18* (2013.01)

(58) Field of Classification Search
CPC ......... H04W 4/06; H04W 18/18; H04W 4/50; H04W 28/24; H04L 1/0026; H04L 1/0029
See application file for complete search history.

(56) References Cited

U.S. PATENT DOCUMENTS

| 5,613,209 | A  |   | 3/1997  | Peterson et al. |
|-----------|----|---|---------|----------------|
| 7,046,964 | B1 | * | 5/2006  | Sullivan ............... H04B 17/318 375/360 |
| 7,190,937 | B1 | * | 3/2007  | Sullivan ............... H04B 17/382 455/67.11 |
| 8,195,215 | B2 |   | 6/2012  | Marocchi et al. |
| 9,686,665 | B2 |   | 6/2017  | Igumnov et al. |
| 10,911,230 | B2 | * | 2/2021 | Gladwin ............... G06F 3/0673 |
| 11,343,653 | B2 | * | 5/2022 | Talebi Fard .......... H04W 8/186 |
| 11,516,645 | B2 | * | 11/2022 | Bercovici ............. H04W 28/26 |

(Continued)

FOREIGN PATENT DOCUMENTS

| KR | 102362027 B1 | 2/2022 |
| WO | 2022020063 A1 | 1/2022 |

OTHER PUBLICATIONS

Jacob Shem Tov, et al.: Method and Apparatus for Providing Device to Device Communications, U.S. Appl. No. 17/615,907, filed Feb. 22, 2022, all pages.

(Continued)

*Primary Examiner* — Hai V Nguyen (57) ABSTRACT

A method and apparatus for assigning and associating devices using a particular talkgroup to a particular network slice is provided herein. During operation talkgroups within a communication system will be assigned to particular network slices. Some network slices may have a single talkgroup assigned to them, and other network slices may have multiple talkgroups assigned to them. During operation, communication-system infrastructure will conduct all communications for a group of devices over a particular talkgroup via a particular network slice.

16 Claims, 5 Drawing Sheets

(56) References Cited

U.S. PATENT DOCUMENTS

| | | | |
|---|---|---|---|
| 11,638,150 B1* | 4/2023 | Visen | H04L 63/166 |
| | | | 726/11 |
| 2011/0286595 A1* | 11/2011 | Resch | H04L 9/0869 |
| | | | 380/46 |
| 2011/0289565 A1* | 11/2011 | Resch | H04L 9/0869 |
| | | | 726/5 |
| 2013/0047057 A1* | 2/2013 | Resch | H04L 9/0869 |
| | | | 714/799 |
| 2014/0243034 A1 | 8/2014 | Gurney et al. | |
| 2018/0376294 A1 | 12/2018 | Tian et al. | |
| 2019/0109711 A1* | 4/2019 | Gladwin | H04L 9/0869 |
| 2020/0228936 A1* | 7/2020 | Talebi Fard | H04W 4/08 |
| 2022/0030407 A1* | 1/2022 | Bercovici | H04W 48/18 |

OTHER PUBLICATIONS

The International Search Report and the Written Opinion, corresponding patent application serial No. PCT/US2023/025405 filed Jun. 15, 2023, mailed: Sep. 15, 2023, all pages.

* cited by examiner

METHOD AND APPARATUS FOR ASSIGNING TALK GROUPS TO NETWORK SLICES

BACKGROUND OF THE INVENTION

With 5G communications becoming ubiquitous, many entities are leveraging 5G to improve communications. For example US Publication No. 20200228936 entitled SESSION ESTABLISHMENT TO JOIN A GROUP COMMUNICATION, describes how to provide different 5G network slices to different user groups. As described in the '936 publication, providing different network slices to different groups of devices, improves 5G communications among the devices. It would be beneficial if public-safety devices could utilize 5G communications to improve communications. More particularly, it would be beneficial if talkgroups within a public-safety system can be utilized to more-efficiently provide 5G communications to various user groups.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for assigning and associating a particular talkgroup, (e,g, a Land Mobile Radio (LMR) talkgroup), to a particular network slice (e.g. a particular 5G network slice) is provided herein. During operation devices assigned to particular talkgroups within a communication system will also be assigned to particular network slices. Some network slices may have devices utilizing a single talkgroup assigned to them, and other network slices may have devices utilizing multiple talkgroups assigned to them. During operation, communication-system infrastructure will conduct all broadband communications for a group of devices affiliated to a particular talkgroup via a particular network slice. While a group of devices can communicate among each other via a particular talkgroup, broadband communications by those devices (e.g., video uploading, files downloading, giving commands to IoTs, sending email or messages, or communicating through Voice-over-IP, . . . , etc.) will take place utilizing a particular network slice associated with the talkgroup.

It is important to distinguish between a "user group", "group of users", and a "talk group". While a "user group" and "group of users" refers specifically to a group of individuals/devices who wish to communicate with one another, a talkgroup specifically refers to a logical channel used for such communications. For example, a "user group" may utilize a single "talkgroup" for communications among each other (e.g., a group of detectives may utilize talkgroup 1223 to communicate with each other).

Talkgroups are generally used for Push-to-talk (PTT) communications within public safety. PTT devices are commonly employed by public safety personnel, air traffic controllers, emergency workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on their device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios at a time utilizing a talkgroup. Even though a radio may switch between talkgroups, the radio may still only be able to communicate on a single talkgroup at a time. For example, a group of firefighters may be affiliated with or using a firefighter talkgroup and a group of police officers may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on the same talkgroup.

Figure 1:
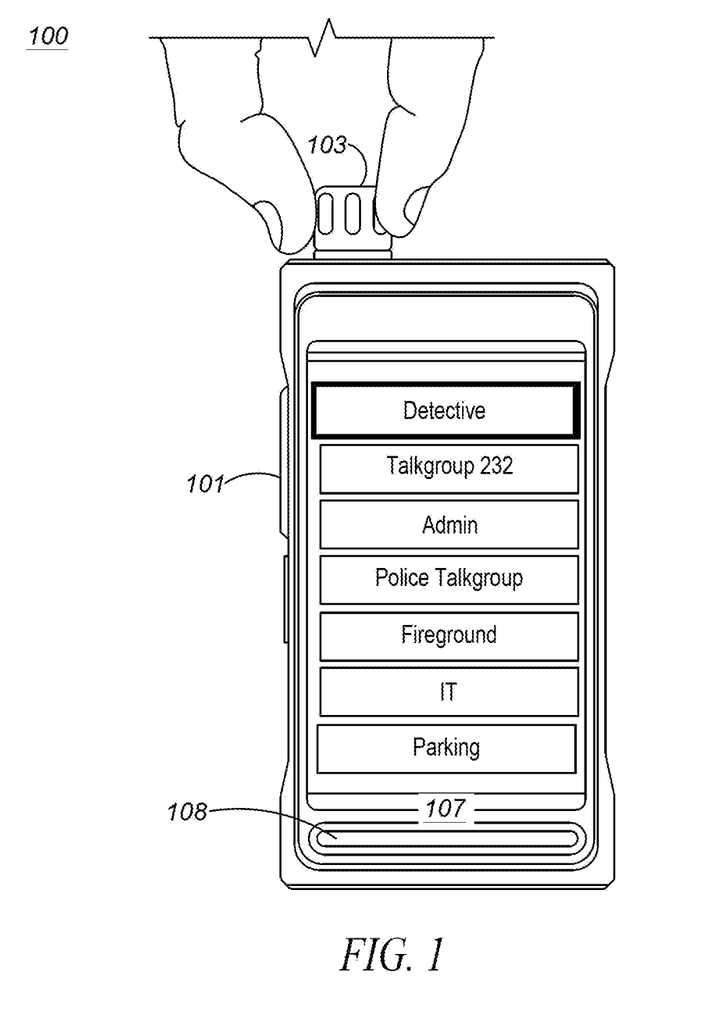
FIG. 1 illustrates push-to-talk (PTT) radio.

FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting over a specific talkgroup. Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof, and in many cases provides a display of available talkgroups available for utilizing.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user preferably grips or contacts the circumferential surface of knob 103 and rotates it a desired amount to scroll through menu items, for example, talkgroups that may be selected for transmission/reception. Once knob 103 is rotated to highlight a particular talkgroup, any activation (pushing) of the PTT button 101 will cause radio 100 to communicate over the highlighted talkgroup.

Figure 2:
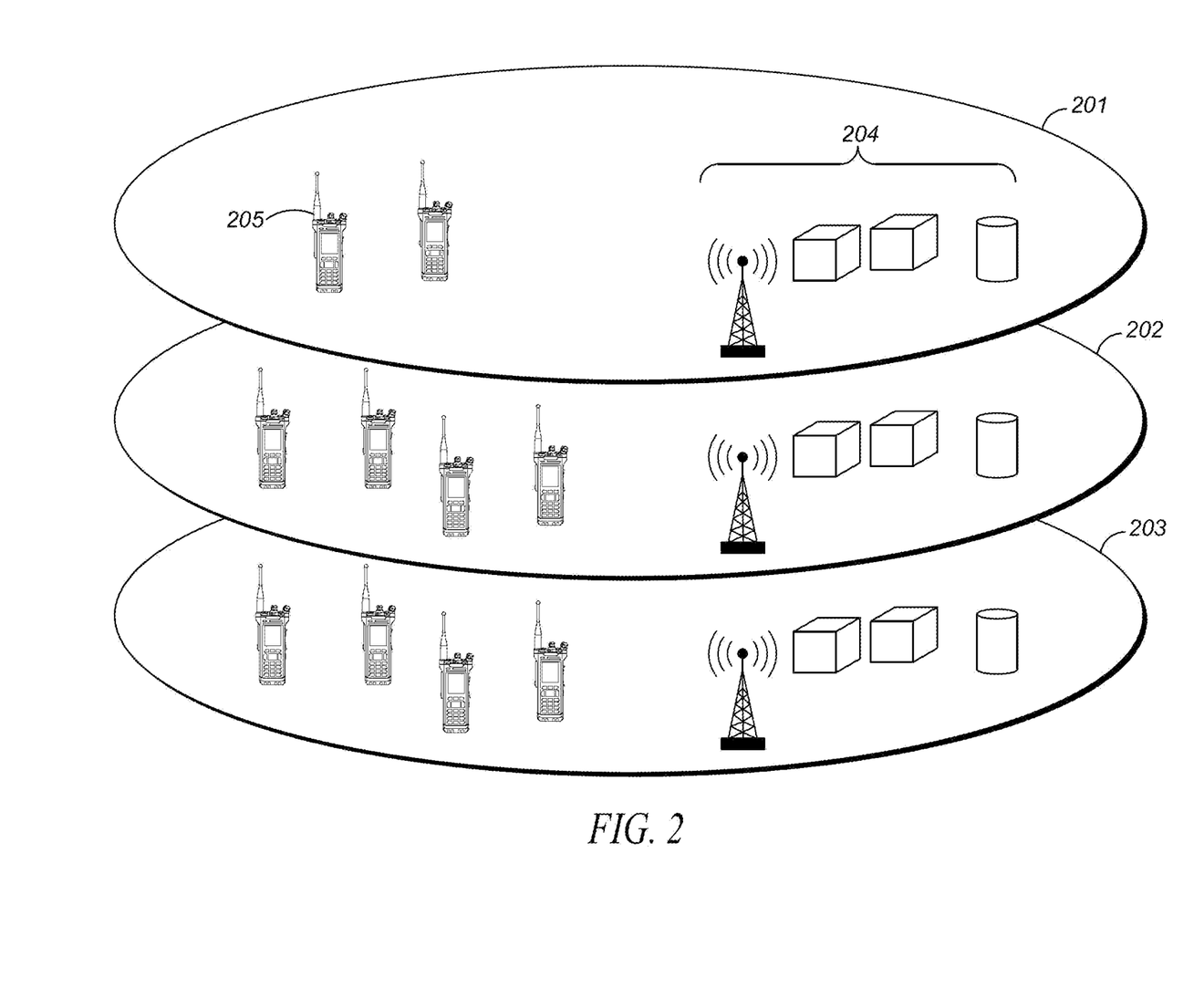
FIG. 2 illustrates 5G network slices

FIG. 2 illustrates a network configured with network slices. As shown in FIG. 2, the same network equipment 204 is configured to provide three virtual networks (network slices) for various devices 205 (only one device labeled in FIG. 2). In this example, a first virtual network (first network slice) 201 is utilized to provide broadband communications (e.g. 5G) over the first virtual network for the various radios that use or join a first talkgroup, while a second virtual network (second network slice) 202 is utilized to provide broadband communications over the second virtual network for the various radios that use or join a second talkgroup. Finally, a third virtual network (third network slice) 203 is utilized to provide broadband communications over the third virtual network for the various radios that use or join a third talkgroup.

As is evident, the communication system shown in FIG. 2 is configured into broadband network slices, which can be defined as a network configuration that allows multiple virtual networks (network slices, sub-nets, or sub-networks) to be created on top of a common physical infrastructure 204. This configuration has become an essential component of the overall 5G architectural landscape. Each "slice" or sub-network can be allocated based on the specific needs of an application, use case, event, or customer. In the present invention, each talkgroup is affiliated with a single network slice. For example, network infrastructure 204 can be configured to support a first broadband network slice 201 (i.e., for radios that are affiliated with a first talkgroup) that provides infrastructure 204 that values high reliability and security and is more forgiving with respect to latency. The same network infrastructure can be configured to support a second broadband network slice 202 (i.e. for other radios that are affiliated with a second talkgroup) to supply infrastructure 204 for other devices that may need ultra-low latency and high data speeds. Other network slices 203 may be provided, each supporting its own reliability, latency, QoS, . . . , etc. Network slicing in 5G supports these diverse services and facilitates the efficient reassignment of resources from one virtual network slice to another.

As is evident in FIG. 2, the same infrastructure 204 can be utilized to provide many virtual broadband networks (network slices), with each virtual broadband network having its own unique performance requirements, and associated with a particular talkgroup, making the one-size-fits-all approach to service delivery obsolete. Each network slice will have an identification (for example specific IP addresses, subnet, talkgroup ID, name, and/or other attribute that distinctly identifies the network slice).

Figure 3:
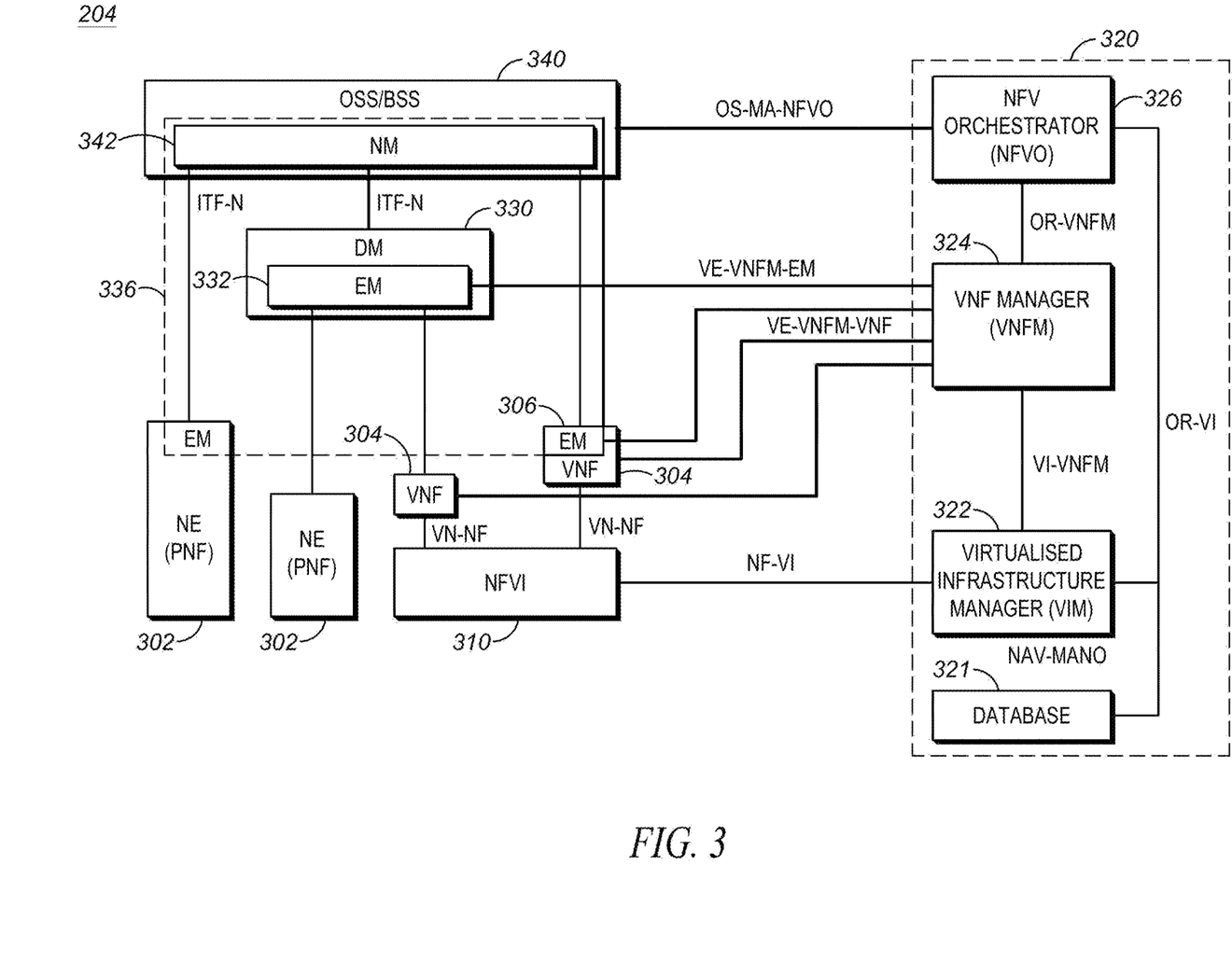
FIG. 3 illustrates circuitry for associating network slices with talkgroups.

FIG. 3 illustrates a network function virtualization (NFV) architecture as equipment 204 in accordance with some embodiments. NFV architecture 204 functions to both implement slices and manage and orchestrate the slices so implemented over the life cycle of each slice. NFV architecture 204 is also utilized to associate particular talkgroups to particular network slices so that a devices utilizing a single talkgroup may be associated with a single network slice, exclusively. Alternatively a particular network slice may be associated with multiple talkgroups so long as all members of a particular talkgroup utilize the particular network slice for broadband communications. Regardless of allocation, at least one talkgroup will be associated with a network slice. The life cycle of each slice may include commissioning (creation/instantiation) of the slice, operation or maintenance of the slice (including activation, supervision, reporting, modification, and de-activation), and decommissioning (termination) of the slice.

NFV architecture 204 may include physical components that implement virtualized components with different functionality. NFV architecture 204 may be implemented by, for example, a data center comprising one or more servers in the cloud. NFV architecture 204 may include one or more physical infrastructure devices and multiple applications hosted on one or more platforms. These platforms may include, among others, a localized platform, such as a server, or a distributed platform, such as a cloud computing platform or other distributed computing platform. NFV architecture 204 as illustrated may include Network Elements (NEs) 302, Virtual Network Functions 304, a Network Virtualization Function Infrastructure (NVFI) 306, circuitry 320 (some of which may be virtual), a Domain Manager (DM) 330, and an Operations Support System/Business Support System (OSS/BSS) 340.

NEs 302 may provide physical components (physical network functions—PNFs), such as dedicated hardware (e.g., processors, antennas, amplifiers, isolators, clock circuitry, transmit and receive chains, among others), as well as software. NFV architecture 204 may include multiple Network Functions (NFs), which each provides a specific functional behavior and has well-defined external interfaces.

VNFs 304 may be an implementation (both components and connectivity when instantiated) of at least one NF instantiated in or deployed on (runs on) NFVI 310. The network slice thus provides functionality of the NF(s), elements supporting the NF functionalities (e.g., library, database, protocol stacks), and elements enabling VNF 304 to run on NFVI 310. The NF functionality and NF elements supporting the NF functionality in each VNF 304 may be managed by an element manager (EM) 306 in that VNF 304. Each VNF 304 may provide a network function that is decoupled from at least some of the infrastructure resources (computational resources, networking resources, memory) used to provide the NF. VNFs 304 can be chained together to realize a desired network service. The virtualized resources may provide VNFs 304 with desired network resources.

VNFs 304, like NEs 302, may be managed by one or more EMs 306. EM 306 may provide functions for management of virtual or physical network elements, depending on the instantiation. EM 306 may manage individual NEs 302 and NEs 302 of a sub-network, which may include relations between NEs 302. For example, EM 306 of a VNF 304 may be responsible for configuration for the NFs provided by VNF 304, fault management for the network functions provided by VNF 304, accounting for the usage of network slice functions of VNF 304, and collecting performance measurement results for the functions provided by VNF 304.

NFVI 310 includes all hardware and software in the environment in which network slices 310 are deployed. NFVI 310 contains a NFVI node that has one or more physical devices deployed and managed as a single entity to provide the NFVI functions to support the network slice environment. NFVI 310 may control VNFs 304 via Vn-Nf reference points. Although not shown, NVFI 310 may contain both virtualized and non-virtualized resources that provide computational abilities, storage (either block or file-system level) and networking elements that may include networks, subnets, ports, addresses, links and forwarding rules to ensure intra- and inter-network slice connectivity.

Circuitry 320 may include a Virtualized Infrastructure Manager (VIM) 322, a Virtual Network Slice Manager (VNSM) 324, and a Network Function Virtualization Orchestrator (NFVO) 326. Circuitry 320 may manage NFVI 310. Circuitry 320 may create or terminate a network slice, increase or decrease network slice capacity, or update or upgrade software and/or configuration of a VNF 304. Circuitry 320 may have access to various data repositories including network services, network slices available, NFV instances and NFVI resources with which to determine resource allocation.

Circuitry 320 may thus orchestrate the instantiation of network services, and the allocation of resources used by VNFs 304. Circuitry 320 may, along with OSS/BSS 340, be used by external entities to deliver various NFV business benefits. OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling.

VIM 322 is responsible for controlling and managing the NFVI resources, including the compute, storage and network resources. VIM 322 may be specialized in handling a particular type of NFVI resource (e.g., compute-only, storage-only, networking-only), or may be capable of managing multiple types of NFVI resources. VIM 322 may orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g., hypervisors), and discovery of the capabilities and features (e.g., related to usage optimization) of such resources. To this end, VIM 322 may control and manage the NFVI resources via Nf-Vi reference points. VIM 322 may further collect and forward performance measurements and events to VNSM 324 via Vi-VNSM reference point and to NFVO 326 via the Or-Vi reference point.

VNSM 324 is responsible for the lifecycle management of network slices through a Ve-Vnfm-vnf reference point. VNSM 324 may orchestrate NFVI resources via VIM 322 and provide overall coordination and adaptation for configuration and event reporting between VIM 322 and EMs 306 and Network Managers (NMs) 342 via a Ve-Vnfm-em reference point. VNSM 324 may be assigned the management of a single network slice, or the management of multiple network slices 320 of the same type or of different types. To this end, VNSM 324 may discover available services provisioning, manage virtualized resource availability/allocation/release and provide virtualized resource fault/performance management, in addition to providing service lifecycle management that may include instantiating a network slice, modifying the network slice instances, and terminating the network service, as well as releasing the NFVI resources for the service to the NFVI resource pool to be used by other services.

NFVO 326 manages the Network Service (NS) lifecycle and coordinates the management of the NS lifecycle, the network slice lifecycle (supported by the VNSM 324) and the NFVI resources (supported by VIM 322) to ensure an optimized allocation of the necessary resources and connectivity. NFVO 326 may coordinate VNFs 304 as part of network services that jointly realize a more complex function, including joint instantiation and configuration, configuring connections between different VNFs 304 and managing dynamic changes of the configuration. NFVO 326 may provide this orchestration through an OS-Ma-NFVO reference point with NM 342 of the OSS/BSS 340, which may also include a domain manager (DM) 330 that itself contains an EM 332.

EMs 306, 322 (whether in a network slice 306 or NE 302) may be managed by NM 342 of OSS/BSS 340 through Itf-N reference points. NM 342 may provide functions with the responsibility for the management of a network, mainly as supported by EM 332 but may also involve direct access to the network elements. NM 342 may connect and disconnect network slice external interfaces to physical network function interfaces at the request of NFVO 326.

With the advent of 5G networks and disparate types of devices (such as Machine Type Communication (MTC), enhanced Mobile Broadband (eMBB) and Ultra-Reliable and Low Latency Communications (URLLC) devices) using these networks, network management and network slicing is evolving towards a service-based architecture in which virtualization is used. To provide network management and slicing, network provisioning and resource management, fault supervision, performance management (PM) and reporting, and management data analytics may be enabled.

As discussed above, each device utilizing a particular talkgroup (e.g. devices that operate on a same LMR talkgroup channel) will be auto connected to, and is supported by a unique network slice, created and maintained by infrastructure 204. In order to accomplish this, circuitry 320 maintains database 321 comprising a table of network-slice IDs and associated talkgroup IDs as shown in Table 1, below.

TABLE 1

| Talkgroup ID mapped to Network Slice ID | |
|---|---|
| Talkgroup ID | Network Slice ID |
| TID230 | NSID450 |
| TID233 | unassigned |
| . . . | . . . |
| TID723 | NSID1043 |

Any request by a device to join a talkgroup, or change from a first talkgroup to a second talkgroup, is received over a control channel by Network Elements 302, and will be accompanied by a talkgroup ID indicating a desired talkgroup for communications by that device 205. The talkgroup ID is passed to circuitry 320, where VNSM 324 determines an associated network slice from Table 1. VNSM 324 instructs Network Elements 302, NFVO 326, VIM 322, and other elements to also connect device 205 to the associated network slice and utilize the associated network slice for any broadband communications by device 205, in addition to fulfilling the request to join or change talkgroups. Based on the above example, when the device 205 is switched to talkgroup (LMR talkgroup) with talkgroup ID of TID230, VNSM 324 will determine from the Table 1 to switch and connect the device 205 to a 5G network slice associated with Network Slide ID of NSID450. In one example, if this device 205 is switched to another LMR talkgroup with talkgroup ID of TID723, VNSM 324 will determine from the Table 1 to switch and connect the device 205 to another 5G network slice associated with Network Slide ID of NSID1043.

As discussed above, circuitry 320 may create or terminate a network slice. For example, referring to Table 1, TID233 is currently not assigned a network slice. At a future time, if broadband communications (e.g. 5G) were to take place on devices 205 that switched to LMR talkgroup with talkgroup ID of TID233, circuitry 320 could create a network slice for all broadband communications for the devices 205 that affiliated to talkgroup TID233.

Additionally VNF-MAN 324 may change network-slice operating parameters such as increasing or decreasing network slice capacity, increasing or decreasing network slice bandwidth, increasing or decrease network slice latency, increasing or decreasing network slice Quality of Service (QoS), or updating or upgrading software and/or configuration of a VNF 304. Thus, if conditions desired, any talkgroup may have its associated network slice parameters changed. If circuitry 320 has knowledge of a status of an incident type assigned to a user of a talkgroup, a network slice may be created or network slice operating parameters may be changed based on the status of the incident type. For example, an incident that needs high bandwidth 5G communications will need to have higher priority of network slice in eMBB; an incident that needs devices to connect to vast amount of IoT devices needs higher priority of network slice in mMTC; an incident that needs low latency data communication will need higher priority of network slice in URLLC). Thus, a network slice associated with a talkgroup used by devices may be created or modified based on a fact that a public-safety event has occurred. In this context the public-safety event comprises a current public-safety incident assigned to a user of a particular talkgroup, for example a crime investigation, a police chase, a homicide, a robbery, a parking violation, . . . , etc.

A computer-aided dispatch (CAD) incident identifier can be utilized by circuitry 320 to determine a current context for each user. An incident identification (sometimes referred to as an incident scene identifier, or a CAD incident identifier (CAD ID)) is generated for incidents where an officer is dispatched/assigned, or where an officer encounters a public-safety event. This ID (which is assigned to an officer) could be something as simple as a number associated with a particular incident type, or something as complicated as an identification that is a function of populated fields (e.g., time, location, incident type, . . . , etc.), one of which may comprise an incident type. The CAD ID along with device IDs for devices assigned to the CAD ID may be provided to circuitry 320 so that circuitry 320 may create or manage network slice parameters. This information may be provided to circuitry 320 via a network connection to a public-safety dispatch center. So, for example, if a mass event has been assigned to a particular talkgroup, where hundreds of users will be utilizing a talkgroup assigned to a particular network slice, circuitry 320 may increase capacity for the assigned network slice, increase the QoS of the assigned network slice, or change any other operating parameter of the assigned network slice to aid communications for the incident. Database 321 is utilized to store incident types and their associated network slice parameters (e.g., bandwidth, latency, . . . , etc.)

The incident type and status may be determined through CAD ID or via CAD dispatcher input. Thus, for example, when the incident scene is determined to be a car traffic accident based on the CAD ID, and police are performing post-accident evidence collection with no emergency, a network slice parameter can be adjusted so that supports high bandwidth for uploading video to cloud (high eMBB) and more compromising on latency (low URLLC) as less need on low latency data. In another example, if it is determined that the incident escalated based on the CAD ID (e.g. CAD report mentioning keywords like gun, shooting, pursuit, injury etc), then network slice parameter can be adjusted to have highest priority on low latency (high URLLC) and moderate priority on connection to a vast amount of IoTndevices to stay contextual aware with the aid of IoT (moderate mMTC).

Figure 4:
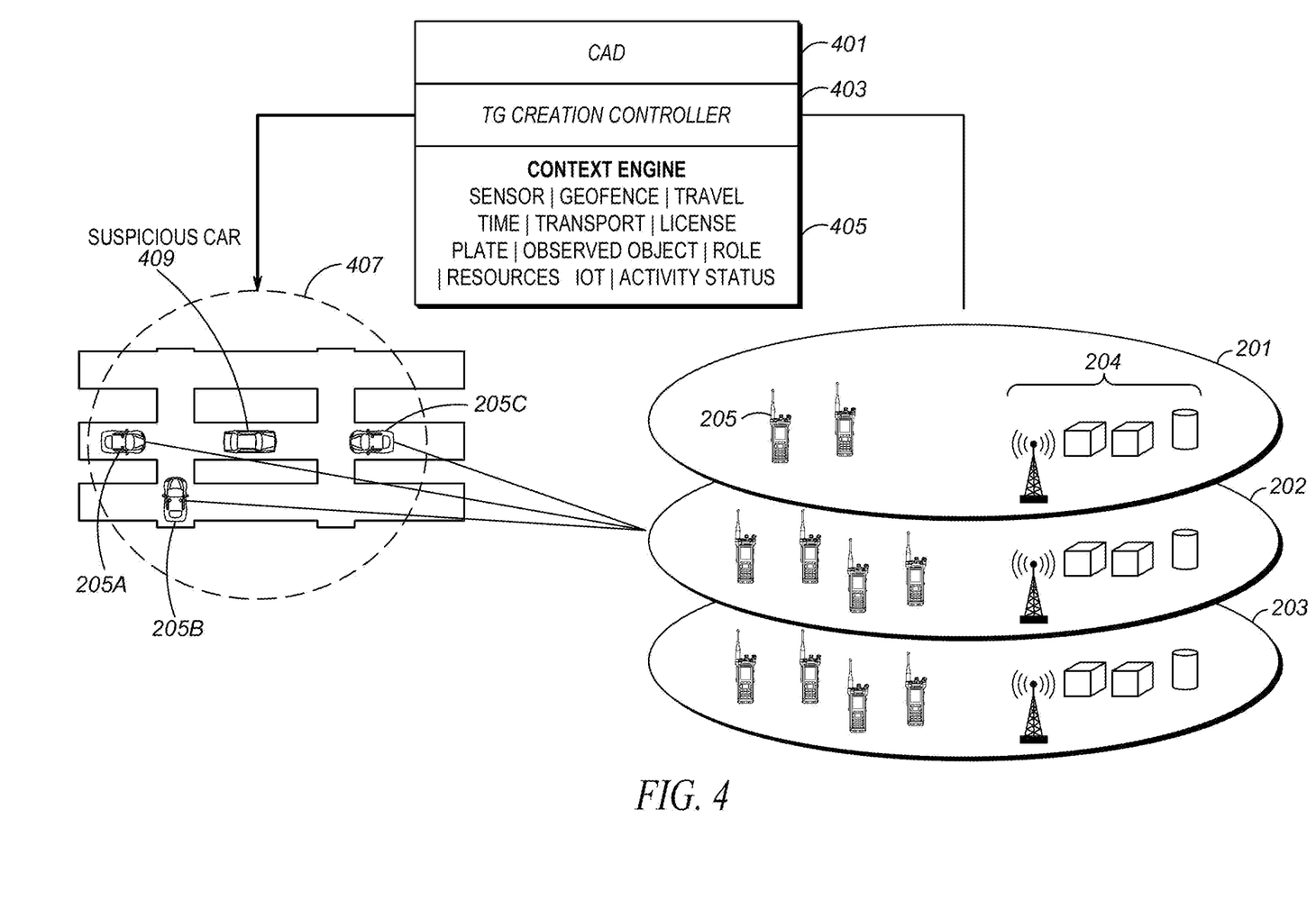
FIG. 4 illustrates the talkgroup (TG) creation controller interaction with the 5G network slices

In one embodiment, network equipment 204 includes computer aided dispatch (CAD) system 401 and/or talkgroup creation controller 403 that is connected to the NFV architecture 204. The talkgroup creation controller 403 will create talkgroups and affiliate to the right device based on contextual info of the devices 205. Contextual info can be retrieved by the talkgroup creation controller 403 from CAD system 401 (task assignment and dispatch info for each device 205), location and sensor info sent from device 205, vehicle info (vehicle that the device 205 is connected to), camera info (e.g. CCTV, body worn camera etc), device status (e.g. on patrol status, pursuit status) etc. A talkgroup will be created by the talkgroup creation controller when a certain talkgroup creation criteria are met. For example, a talkgroup creation criteria can be a detection of a car plate number that will automatically create a talkgroup and affiliate those devices 205 that detects the particular car plate number with a camera; a talkgroup criteria can be a certain task assignment that will automatically create a talkgroup and affiliate those devices that receive the same task (e.g. receive same task ID of a pursuit task from CAD system by dispatcher); a talkgroup creation criteria can be a travel direction that automatically create a talkgroup and affiliate the devices that are heading to a same travel direction; a talkgroup creation criteria can be a estimated arrival time (ETA) that automatically create a talkgroup and affiliate the devices that having ETA less than a threshold to a same destination; etc.

Whether or not a talkgroup is newly-created or not, the contextual information will be sent to Virtual Network Function Manager 324 to create or modify a broadband network slice based on the contextual information and connect the devices that affiliated to talkgroup to the newly created or modified 5G network slice. For example, when a contextual talkgroup is created based on a detected car plate number in a pursuit, a 5G network slice that has high eMBB (high bandwidth to stream the vehicle video) and high URLLC (to PTT over 5G in low latency to intercept or catch the vehicle in pursuit) will be created by Virtual Network Function Manager 324 and all devices (those that involved in the pursuit) that affiliated to this contextual talkgroup will be auto connected to the particular 5G network slice. In another example, when a contextual talkgroup is created based on geofence during an earthquake, a 5G slice that has high URLLC (low latency network slice to enable timely real time communication to safe life & property) and mMTC (network slice that can have large scale IoT support at the earthquake area in the rescue mission) is needed. In another example, when a contextual talkgroup is created based on a task of a crime investigation (task ID received on devices 205), a 5G slice that has high eMBB (high bandwidth to stream CCTV footage) and mMTC (network slices that allow communication to large scale IoT to get leads from IoTs) is needed. In this example, URLLC is not needed (no need for low latency data) in the created 5G slice.

Referring to FIG. 4, for example, assume that a robbery incident happened and an incident CAD ID is created at CAD system 401 with incident contextual data (from various sources, e.g. IoT, CCTV, police radios, vehicle camera, dispatcher input etc). The incident contextual data, including car plate number of the robber vehicle 409, is sent to talkgroup creation controller 403 with a talkgroup creation criteria of: Geofence of 200 meter from detected robber vehicle 409. The talkgroup creation controller 403 then creates a talkgroup and automatically affiliate the devices (205a, 205b, and 205c) that are within 200 meter distance to the detected robber vehicle 409 (one example of robber vehicle 409 detection is through CCTV that perform automatic license plate detection on vehicles on the road). The talkgroup creation controller gathers and stores all the contextual info (from CAD system and live contextual data from Context Engine 405 that gather all contextual data from, said, Internet of Things (IoT), CCTV, body worn camera, vehicular camera, device sensor, radio, infrastructure etc) and automatically affiliates devices 205 into the talkgroup when the talkgroup creation criteria is met (less than 200 meter distance from robber vehicle 409), and un-affiliates devices 205 from the contextual talkgroup when talkgroup creation criteria is not met (more than 200 meter). The contextual information stored in Context Engine 405 is then sent to Virtual Network Function Manager 324 of NFV 204 to create a 5G network slice 202 based on the contextual info. In this example, since the contextual info is vehicle pursuit and criteria of talkgroup formation is geofence of a robber vehicle that indicates a quick and low latency communication and video streaming is required, a 5G network slice consisting mainly of eMBB (high bandwidth) and URLLC (low latency) is created. Virtual Network Function Manager 324 will then send the network slice ID of the newly created 5G network slice to the devices (205a, 205b, and 205c) to connect to the particular 5G network slice.

With the above in mind, NFV architecture 204, and particularly circuitry 320 includes the various shown components connected by a bus. Each component shown in FIG. 3 can be implemented as one or more central processing units (CPUs) or other processing circuitry able to provide any of the functionality described herein when running instructions. Database 321 includes a non-transitory machine-readable medium on which is stored one or more sets of the instructions. Memory 204 may include one or more of static or dynamic storage, or removable or non-removable storage, for example. A machine-readable medium may include any medium that is capable of storing, encoding, or carrying instructions for execution by the components shown in FIG. 3, such as solid-state memories, magnetic media, and optical media. Machine-readable medium may include, for example, Electrically Programmable Read-Only Memory (EPROM), Random Access Memory (RAM), or flash memory.

The instructions may enable network equipment 204 to operate in any manner thus programmed, such as the functionality described specifically herein, when the elements in FIG. 3 execute the instructions. The machine-readable medium may be stored as a single medium or in multiple media, in a centralized or distributed manner.

With the above in mind, circuitry 320 (and in particular VNF manager 324) is configured to receive a notification that a device is part of, or has joined a particular talkgroup, wherein the talkgroup comprises a logical communications channel. This notification preferably comes from a talkgroup creation controller of a communication system, such as controller 403. VNF manager 342 is also configured to determine a particular network slice based on the particular talkgroup. As discussed above, this can be accomplished by accessing table 1, stored in memory 321. Finally, VNF manager 324 assigns the device to the particular network slice and configures network equipment 204 to facilitate broadband communications to/from the device over the particular network slice.

As discussed above, database 321 comprises a table of talkgroups and their associated network slice VNF manager can determine the particular network slice by accessing the database. Additionally, the database may comprise a mapping of a single network slice per talkgroup, where talkgroups do not share network slices. Alternatively, some talkgroups may share a single network slice.

As discussed above, VNF manager 324 may receive an incident type assigned to the talkgroup. This incident type is preferably received from a public-safety dispatch center or e911 call center that is coupled to network equipment 204 as known in the art. Network slice parameters for the particular network slice may be modified by VNF manager 324 based on the incident type by increasing or decreasing network slice capacity, increasing or decreasing network slice bandwidth, increasing or decreasing network slice latency, or increasing or decreasing network slice Quality of Service (QoS). Alternatively the particular network slice may be created specifically for the talkgroup based on the incident type.

With the above in mind, circuitry 320 comprises a database comprising talkgroups and their associated network slice, wherein the talkgroups comprise logical communications channels and the network slices comprise a subnet of a communications system. VNF manager 324 is configured to receive an indication that a device has joined a particular talkgroup, access the database to determine a particular network slice based on the particular talkgroup, facilitate communications for the device using the particular network slice, receive an incident type, and modify network slice parameters for the particular network slice based on the incident type.

Figure 5:
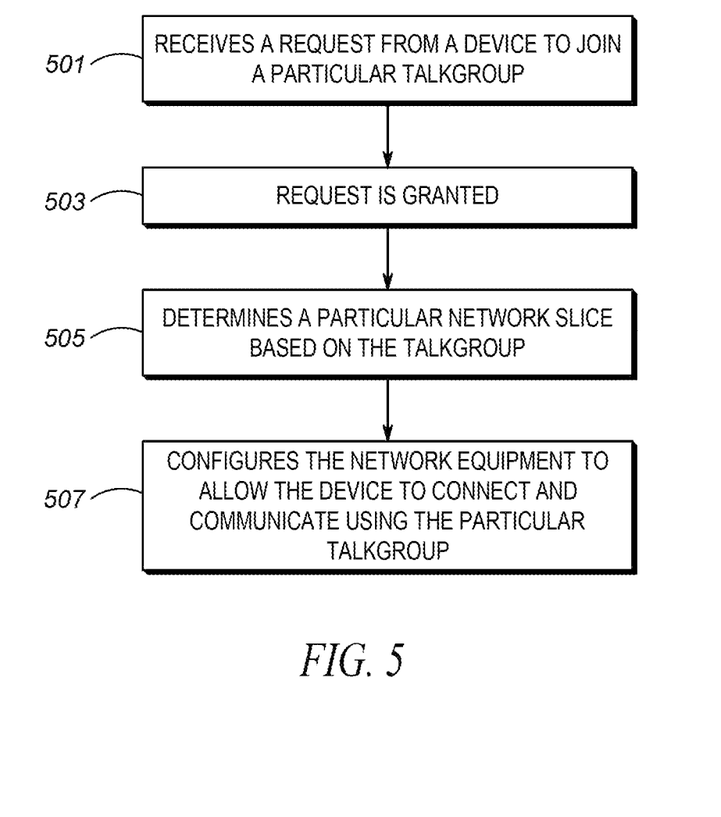
FIG. 5 is a flow chart showing operation of the circuitry of FIG. 3.

FIG. 5 is a flow chart showing operation of network equipment 204. The logic flow begins at step 501 where TG creation controller 403 receives a request from a device to join a particular talkgroup, wherein the talkgroup comprises a logical communication channel. This request is granted by controller 403 at step 503 by configuring the network equipment 204 to allow the device to connect and communicate using the particular talkgroup. Circuitry 320 is notified by controller 403 of the device joining the particular talkgroup. At step 505, VNF manager 324 determines a particular network slice based on the talkgroup and configures network equipment 204 to allow the device to connect and communicate using the particular network slice.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   circuitry configured to:
   receive a notification that a device is part of, or has joined a particular talkgroup, wherein the particular talkgroup comprises a logical communications channel;
   determine incident contextual information of a public safety incident based on a computer aided dispatch (CAD) identification;
   create a Land Mobile Radio (LMR) narrowband talkgroup based on a comparison of the incident contextual information with talkgroup creation criteria;
   determine, based on the LMR narrowband talkgroup, a particular network slice configured with a network slice operating parameter; and
   assign the device to the particular network slice.

2. The apparatus of claim 1 further comprising:
   a database comprising talkgroups and their associated network slice; and
   wherein determines the particular network slice by accessing the database.

3. The apparatus of claim 2 wherein the database comprises a mapping of a single network slice per talkgroup, where talkgroups do not share network slices.

4. The apparatus of claim 2 wherein the database comprises a mapping of a single network slice per talkgroup, where some talkgroups share network slices.

5. The apparatus of claim 1 wherein the circuitry is further configured to:

receive an incident type; and modify network slice parameters for the particular network slice based on the incident type.

6. The apparatus of claim 5 wherein the network slice parameters are modified by increasing or decreasing network slice capacity, increasing or decreasing network slice bandwidth, increasing or decreasing network slice latency, or increasing or decreasing network slice Quality of Service (QOS).

7. The apparatus of claim 1 wherein the circuitry is further configured to:

receive an incident type; and create the particular network slice based on the incident type.

8. The apparatus of claim 1, wherein the network slice type comprises a configuration for at least one of: Machine Type Communication (MTC), enhanced Mobile Broadband (eMBB) and Ultra-Reliable, or Low Latency Communications (URLLC).

9. An apparatus comprising:

a database comprising talkgroups and their associated network slice, wherein the talkgroups comprise logical communications channels and the network slices comprise a subnet of a communications system;

circuitry configured to:

receive an indication that a device has joined a particular talkgroup;

determine incident contextual information of a public safety incident based on a computer aided dispatch (CAD) identification;

create a Land Mobile Radio (LMR) narrowband talkgroup based on a comparison of the incident contextual information with talkgroup creation criteria;

access, based on the LMR narrowband talkgroup, the database to determine a particular network slice configured with a network slice type;

facilitate communications for the device using the particular network slice;

modify network slice parameters for the particular network slice based on the incident contextual information;

wherein the circuitry modifies the network slice parameters by increasing or decreasing network slice capacity, increasing or decreasing network slice bandwidth, increasing or decreasing network slice latency, or increasing or decreasing network slice Quality of Service (QoS).

10. A method comprising the steps of:

receiving a request from a device to join a particular talkgroup, wherein the particular talkgroup comprises a logical communication channel;

determining incident contextual information of a public safety incident based on a computer aided dispatch (CAD) identification;

creating a Land Mobile Radio (LMR) narrowband talkgroup based on a comparison of the incident contextual information with talkgroup creation criteria;

determining, based on the LMR narrowband talkgroup, a particular network slice configured with a network slice type; and configuring a network equipment to allow the device to connect and communicate using the particular network slice; and configuring the network equipment to allow the device to connect and communicate using the particular talkgroup.

11. The method of claim 10 wherein the step of determining the particular network slice comprises the step of accessing a database comprising talkgroups and their associated network slices.

12. The method of claim 11 wherein the database comprises a mapping of a single network slice per talkgroup, where talkgroups do not share network slices.

13. The method of claim 11 wherein the database comprises a mapping of a single network slice per talkgroup, where talkgroups share network slices.

14. The method of claim 10 further comprising the steps of:

receiving an incident type; and creating the particular network slice based on the incident type.

15. The method of claim 10 further comprising the steps of:

receiving an incident type; and modifying network slice parameters for the particular network slice based on the incident type.

16. The method of claim 15 wherein the network slice parameters are modified by increasing or decreasing network slice capacity, increasing or decreasing network slice bandwidth, increasing or decreasing network slice latency, or increasing or decreasing network slice Quality of Service (QOS).

* * * * *